United States Patent [19]
Yamaura et al.

[11] Patent Number: 5,626,635
[45] Date of Patent: May 6, 1997

[54] PROCESSES FOR MAKING POSITIVE ACTIVE MATERIAL FOR LITHIUM SECONDARY BATTERIES AND SECONDARY BATTERIES THEREFOR

[75] Inventors: Junichi Yamaura, Kobe; Kazuhiro Okamura, Kadoma; Yoshiaki Nitta, Hirakata, all of Japan

[73] Assignee: Matsushita Electric Industrial Co., Ltd., Osaka, Japan

[21] Appl. No.: 573,505

[22] Filed: Dec. 15, 1995

[30] Foreign Application Priority Data

Dec. 16, 1994 [JP] Japan ............................ 6-313140
Dec. 16, 1994 [JP] Japan ............................ 6-313141
Mar. 2, 1995 [JP] Japan ............................ 7-042900

[51] Int. Cl.$^6$ ............................................. H01M 4/26
[52] U.S. Cl. .................... 29/623.5; 423/594; 429/218
[58] Field of Search ............................ 29/623.5, 623.1; 423/594, 179.5, 49, 138, 593; 429/218, 223, 224

[56] References Cited

U.S. PATENT DOCUMENTS 4,302,518  11/1981  Goodenough et al. ............. 423/594 X
5,135,732   8/1992  Barboux et al. ..................... 423/593
5,370,948  12/1994  Hasegawa et al. ................ 423/594 X
5,490,320   2/1996  Hasegawa et al. .................... 29/623.1

FOREIGN PATENT DOCUMENTS 63-299056  12/1988  Japan.

*Primary Examiner*—Anthony Skapars
*Attorney, Agent, or Firm*—Ratner & Prestia

[57] ABSTRACT

A process for manufacturing lithium containing oxides represented by a formula $LiNi_xCo_{(1-x)}O_2$, or a formula $LiNi_xMn_{(1-x)}O_2$, having almost single phase, through completely replacing a part of the Ni with Co or Mn. The single phase structure has the advantage that Li mobility in the crystal is high, the positive active materials having almost single phase show a large capacity and excellent cycle characteristics. According to the method, the positive active materials of lithium containing oxides are prepared by burning lithium compounds and composite hydroxides comprising Ni and Co, or Ni and Mn. The composite hydroxides are obtained through co-precipitation of nickel and cobalt hydroxides, or nickel and manganese hydroxides by adding caustic alkali aqueous solutions to mixed solutions containing nickel and cobalt salts or nickel and manganese salts.

10 Claims, 3 Drawing Sheets

1

PROCESSES FOR MAKING POSITIVE ACTIVE MATERIAL FOR LITHIUM SECONDARY BATTERIES AND SECONDARY BATTERIES THEREFOR

BACKGROUND OF THE INVENTION

The present invention relates to a process for manufacturing lithium secondary batteries, especially positive active materials to be used for the batteries.

Along with the rapid development of portable or cordless electric devices and appliances, there is an increased demand for compact and light weight secondary batteries having high energy density. In this respect, the lithium secondary batteries create greater expectations because of their high voltage and high energy density. Recently, lithium secondary batteries, so-called "lithium-ion batteries", having been developed employing $LiCoO_2$ as the positive electrodes and carbon materials as the negative electrodes. The high voltages of these batteries are due to the operating positive electrode potential of $LiCoO_2$ which is as high as 4 V compared to Li electrode potential. Batteries using carbon materials as negative electrodes have better charge-discharge cycle life characteristics and safety than the batteries using metallic Li negative electrodes, because the carbon material used for negative electrodes utilize the intercalation reaction which does not cause dendritic and/or mossy deposition of Li.

In view of the supply and cost of Co, efforts have been made to develop lithium containing oxides to replace $LiCoO_2$. $LiNiO_2$ has been identified as a potential replacement. $LiNiO_2$, $LiCoO_2$ and like kinds of lithium containing oxides provide high cell voltages and belong to the same class of compounds having hexagonal crystal structure for which the intercalation reaction is available. These are the expected candidates for positive active material. From this point of view, here have been proposals to use materials such as $Li_xNiO_2$ (U.S. Pat. No. 4,302,518), $Li_yN_{(2-y)}O_2$ (Japanese Laid Open Patent Application No. Hei2-40861). Both are related to $LiNiO_2$; and $Li_yNi_xCo_{(1-x)}O_2$ as claimed in Japanese Laid Open Patent Application No. Sho63-299056; $Li_yNi_{(1-x)}M_xO_2$ (where, M is one of Ti, V, Mn or Fe), which are lithium containing oxides wherein a part of Ni the of $LiNiO_2$ is replaced with another metal. Other lithium containing oxides are also proposed, which include $A_xM_yN_zO_2$ (where, A is an alkaline metal, M is a transition metal, N is selected from the group of Al, In or Sn) (Japanese Laid Open Patent Application No. Sho62-90863); $Li_xM_yN_zO_2$ (where, M is at least one selected from the group of Fe, Co, Ni; N at least one selected from the group of Ti, V, Cr, Mn) Japanese Laid Open Patent Application No. Hei4-267053). Utilizing these materials, the active materials have been made to develop high energy density lithium secondary batteries of the class having 4 V discharge voltage.

Among these lithium containing oxides, $LiNiO_2$ also has a 4 V operating positive electrode potential compared to a lithium electrode, and results in a secondary battery of high energy density. However, the capacities of the batteries using $LiNiO_2$ positive electrodes deteriorate as the charge-discharge cycles proceed, down to 65% of the initial capacity after the 50th cycle. The unsatisfactory charge-discharge cycle characteristic is a problem.

As described above, in order to solve the problem, lithium containing oxides in which a part of Ni is replaced with another metal have been proposed. The materials in which a part of the Ni in $LiNiO_2$ was replaced with another metal show relatively improved charge-discharge cycle reversibility, but the discharge capacity and voltage tend to go down. Thus, the principally desired high voltage, high energy density, characteristics are diminished. Among these proposals, the one in which a part of Ni is replaced with Co or Mn shows relatively favorable results in each characteristic for charge-discharge cycle reversibility, discharge capacity and voltage, as compared with conventional lithium containing oxides.

Active materials in which a part of Ni in $LiNiO_2$ was replaced with Co are generally prepared by adding Co compounds like cobalt hydroxide, Li compounds like lithium hydroxide and Ni compounds like nickel hydroxide, and then burning them (herein after referred to as the mixing and burning period). The burning temperature for obtaining compounds having monophase crystal structure where the Co is replaced is to be within a range of 600° C. to 800° C. Growth of the monophase depends on burning temperature as the reaction is not complete at temperatures under 600° C. As the Ni content increases, the single phase is created but the crystalline property deteriorates at temperatures exceeding 800° C. It seems that at a temperature higher than 800° C., Ni and Co atoms locate in the sites in the crystal where Li atoms should be, causing a disordered structure.

Active materials in which a part of the Ni in $LiNiO_2$ was replaced with Mn are generally prepared by adding Mn compounds like manganese dioxide, manganese nitrate, Li compounds like lithium hydroxide and Ni compounds like nickel hydroxide, and then burning them using the mixing and burning method. In this mixing and burning method, however, a burning temperature higher than 800° C. is needed to replace a part of the Ni completely with Mn. At a temperature lower than 800° C. the substitution reaction is not completed insofar as can be estimated using X-ray diffraction techniques.

However, when it is burned at a temperature higher than 800° C., Ni an Mn atoms locate in the sites in the crystal where Li atoms should be, causing disorder, deterioration of the ability to have the desired number of charge-discharge cycles and discharge capacity. Therefore, burning a lithium containing oxide based on $LiNiO_2$ at a high temperature is not recommended.

Even if burned at any temperature range the discharge capacity tends to follow a decreasing trend as the charge-discharge cycles proceed, when the conventional manufacturing process (mixing and burning method) is used.

SUMMARY OF THE INVENTION

The present invention aims to solve the problems described above and offers a manufacturing process for lithium containing composite oxides represented by the general formula $LiNi_xCo_{(1-x)}O_2$ or the formula $LiNi_xMn_{(1-x)}O_2$ wherein the crystal structure is a single phase, and highly completed without crystal defects, and complete replacement of a part of the Ni and Co or Mn.

It is possible to solve the above mentioned problems by a manufacturing process for positive active materials for lithium secondary batteries according to the present invention. The positive active materials according to the invention, specify the value x in the formula $LiNi_xCo_{(1-x)}$—$O_2$ to be $0.95 \geq x \geq 0.70$. At the beginning of the manufacturing process, composite hydroxides comprising Ni and Co are made through co-precipitation of cobalt and nickel hydroxides by adding a caustic alkali aqueous solution to a mixed aqueous solution containing cobalt and nickel salts. Then the composite hydroxides are mixed with lithium compounds like lithium hydroxide, and burned at a temperature in the range between 600° C. and 800° C. to make the positive active materials. The manufacturing process for a lithium containing oxide, nickel and manganese represented by the formula $LiNi_xMn_{(1-x)}O_2$, where the value x is specified to be $0.95 \geq x \geq 0.70$ is shown as follows. At the beginning of the process, the composite hydroxides comprising manganese and nickel are provided through co-precipitation of manganese and nickel hydroxides by adding a caustic alkali aqueous solution to mixed aqueous solution containing manganese and nickel salts. Then the composite hydroxides are mixed with lithium compounds like lithium hydroxide, and burned at a temperature in the range between 600° C. and 800° C. to make positive active materials.

In a manufacturing process according to the present invention, composite hydroxides comprising nickel and cobalt (hereinafter referred to as Ni—Co composite hydroxide) are provided through co-precipitation of cobalt and nickel hydroxides by adding a caustic alkali aqueous solution to a mixed aqueous solution containing cobalt and nickel salts. In the composite hydroxides, therefore, a part of the Ni is completely replaced with Co, and the crystal structure reaches the level of a solid solution. The crystallization is completed to an extremely high level, or the single phase status is achieved as observed through an X-ray diffraction pattern.

As the Ni—Co composite hydroxides in the monophase state are used, the resulting composite oxides after the burning have the crystal structure of a complete single phase. According to the present invention, the burning temperature is specified to be within a range 600° C.–800° C., and no disturbance arises in the crystal structure at said temperatures.

When Mn is used instead of Co, the crystallization is likewise completed to an extremely high level showing no disturbance in the crystal structure.

In the case of using Co, in order to obtain a stable crystal structure with the mixed valence state of Ni and Co, more than 0.05 Ni (corresponds to the value x being 0.95) needs to be replaced with Co. However, when the amount of Ni replaced with Co is more than 0.5, the active materials show significant decrease in their capacities because of the decrease of mobilities for Li by distortions of the crystal, disintegration of crystal structure and the imbalance in the mixed valence state. In the case of using Mn, in order to obtain a stable crystal structure with the mixed valence state of Ni and Mn, more than 0.05 Ni also need to be replaced with Mn. However, when the amount of Ni replaced with Mn is more than 0.30 (corresponds to the value x being 0.70), the active materials reveal a significant decrease in their capacities because of the reasons described above.

BRIEF DESCRIPTION OF THE INVENTION

DESCRIPTION OF THE INVENTION

The following embodiments according to the present invention are described by referring to the figures:

(Embodiment 1)

First, a manufacturing process for a Ni—Co composite hydroxide through co-precipitation according to the present invention is described.

A saturated nickel sulfate aqueous solution was prepared by putting reagent nickel sulfate into water. A saturated aqueous solution containing nickel sulfate and cobalt sulfate was prepared by adding a specified quantity (according to the targeted Co/Ni ratio) of cobalt sulfate to the solution with the final composition adjusted using water. Slowly pouring caustic alkali aqueous solution containing sodium hydroxide into the saturated aqueous solution caused co-current precipitation of Ni hydroxide and Co hydroxide (co-precipitation). The precipitation was finished by adding sufficient caustic alkali solution. Then the Ni—Co composite hydroxide was obtained by filtering the deposits and rinsing with water. The water rinsing was repeated while continuously measuring the pH value to confirm that the remaining alkali was almost zero. The resulting composite hydroxide was dried with a hot air (dryer used was set at 100° C).

A Ni—Co composite hydroxide prepared according to the foregoing showed an X-ray diffraction pattern being almost entirely of a single phase, and an elementary analysis disclosed that the composition contained Co and Ni in almost the targeted ratio.

Although in this embodiment nickel sulfate was used as the source of Ni, and cobalt sulfate as the source of Co in the co-precipitation process, other compounds such as nickel nitrate and cobalt nitrate may also be used as the source of Ni and Co, respectively. Any salt that can make an aqueous solution is usable. Although an aqueous solution of sodium hydroxide was used as the caustic alkali solution in this embodiment, other caustic alkali solutions such as aqueous solutions of potassium hydroxide and lithium hydroxide may be used.

A burning process using a Li compound is described as follows. Lithium hydroxide was used as the Li compound. The Ni—Co composite hydroxide obtained through the co-precipitation method described above was mixed with lithium hydroxide so that the number of atoms of Li is equal to the total number of atoms of Co and Ni, and the mixture was ball milled to achieve sufficient grinding and mixing. Then the mixture was placed in an alumina crucible, the first burning (corresponds to preliminary method) was carried out in oxygen for 20 hours at 550° C., and the second burning for 2 hours at 750° C. After the burning the product was gradually cooled to room temperature and milled to a powder to be used as the positive active material.

Figure 1:
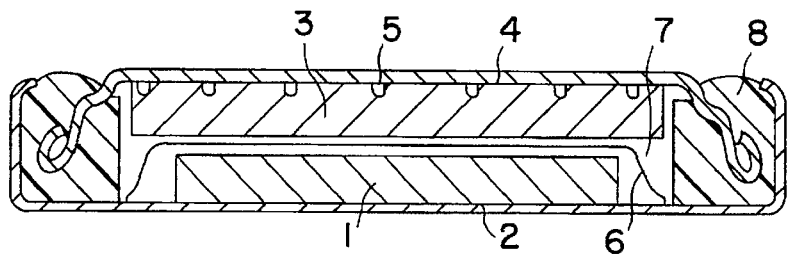
FIG. 1 shows a cross-sectional view of a coin type experimental cell used in the present invention.

After preparing several active materials of various Co/Ni ratios, each sample was examined by an X-ray diffraction method. As the result, when the value x in the formula $LiNi_xCo_{(1-x)}O_2$ representing the composition of the active material was not less than 0.5, the composite material showed a single phase in the X-ray diffraction pattern. When the value of x was less than 0.5, although the X-ray pattern was almost single phase, the peak strength tends to be weak which showed the crystalline growth is not complete. The positive electrode mix consisted of the positive active material with 5 wt % AB(acetylene black) and 4 wt % PVDF (polyvinylidene fluoride). Then the mix was kneaded with a solvent NMP(N-methylpyrrolidinone) to form a paste. Next, the paste was coated on one side of an aluminum foil, dried and pressed to make an electrode plate. FIG. 1 illustrates a vertical cross sectional view of a coin type experimental cell used in the embodiments of the present invention. In FIG. 1, a positive electrode 1 is a disk stamped out of the electrode plate formed as stated above, and was placed inside of a cell case 2. A negative electrode 3 made from lithium metal pressed on a stainless steel net 5 was spot welded inside of a cover 4. A polypropylene separator 6 was put between the positive electrode 1 and the negative electrode 3, and this assembly was soaked with an electrolyte 7. The assembly was tightly sealed using a polypropylene gasket 8. The electrolyte was a solution containing 1 mol $LiPF_6$ (lithium hexafluorophosphate) in a mixed solvent of ethylene carbonate (EC) and diethyl carbonate (DEC).

Positive active materials having a value for x of 0, 0.1, 0.2, 0.3, 0.4, 0.5, 0.6. 0.7, 0.8, .0.9, 0.95, 1.0 respectively in the formula $LiNi_xCo_{(1-x)}O_2$ were prepared and incorporated into said coin type cells. The value x=1.0 denotes the composition having a formula $LiNiO_2$ including no Co. These cells were charged and discharged for life cycle testing. The charge-discharge conditions were: charge-discharge was carried out at a constant current of 0.5 $mA/cm^2$ for the positive electrode at 20° C., the charge end voltage being 4.3 V, and the discharge end voltage being 3.0 V.

Figure 2:
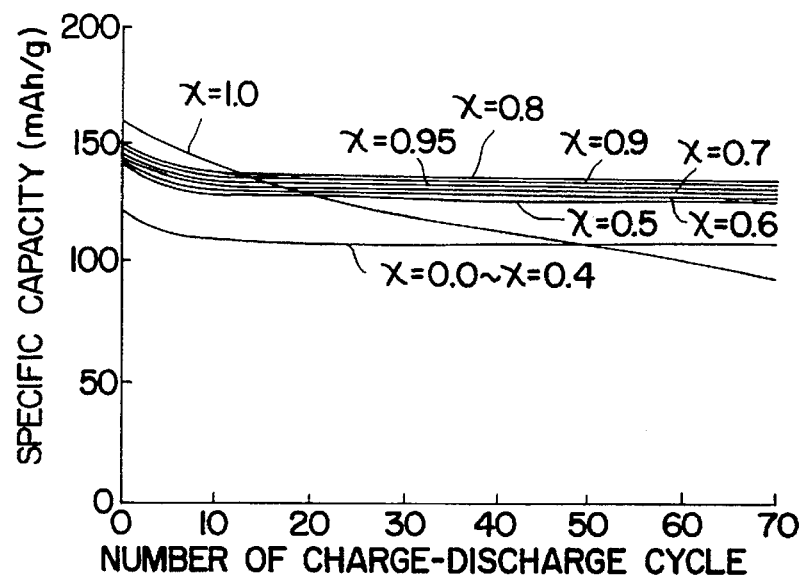
FIG. 2 is a plot of specific capacity against the number of cycles for positive active materials when the value x is varied, in accord with a first embodiment of the invention.

FIG. 2 shows the results of life cycle tests. As shown in FIG. 2, the positive active materials where x has a value within the range x=0.1~0.4 show small initial capacities, i.e., about 120 mAh/g.

The positive active materials where x is within a range x=0.5~0.95 show large initial capacities, about 140~150 mAh/g, a good cycle characteristics with 90% capacities kept at the 50th cycle from the initial capacity and does not show any decrease in the cycles following the 50th cycle. The positive active material where x=1.0 (no Co content) shows significant cycle deterioration, down to 65% at the 50th cycle from the initial capacity and deteriorates further in the following cycles, although the initial capacity was higher than 150 mAh/g.

Consequently, the preferable value x in the active material $LiNi_xCo_{(1-x)}$ should be within a range of 0.5~0.95.

Next, the positive active materials represented by a formula $LiNi_xCo_{(1-x)}O_2$ whose value x is within a range 0.5~0.95 were prepared using various burning temperatures. The first preliminary burning process at 550° C. for 20 hours was carried out in the same way as the foregoing. In the following stage (the significant second burning process), burning temperatures of 550° C., 600° C., 650° C., 700° C., 750° C., 800° C., 850° C. and 900° C. respectively were examined. These positive active materials prepared at the various temperatures, were incorporated into the coin type cells. These cells were tested in the charge-discharge cycle test method using the same test conditions. The results when the value x was 0.8 are shown in FIG. 3 which is a typical example.

Figure 3:
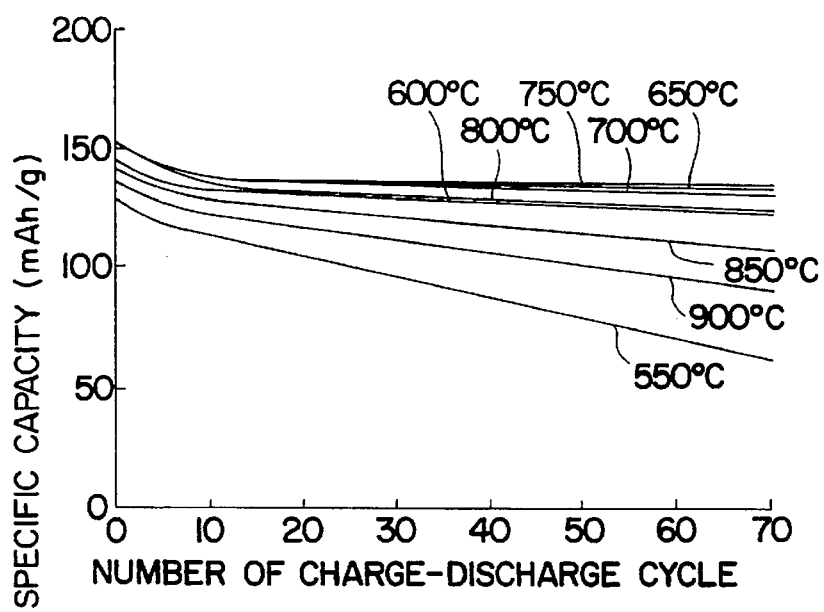
FIG. 3 is a plot of specific capacity against the number of cycles for positive active materials when the burning temperature is varied in accord with a first embodiment of the invention.

As shown in FIG. 3, the active materials prepared within the burning temperature range of 600° C.~800° C. show good results in initial capacity and in cycle characteristics. Those samples burned at 550° C. show insufficient initial capacity and unsatisfactory cycle characteristics. Those samples burned at 850° C. and 900° C. show smaller initial capacity and a remarkable deterioration during cycling.

From the foregoing results, the recommended burning temperature range is between 600° C.~800° C. However, because cycle deterioration increases slightly just at 600° C. and 800° C., and the initial capacity is slightly smaller at 800° C., a range 650° C.~750° C. is preferred.

The same experiments in regard to burning temperatures were carried out not only for the materials whose value x is 0.8, but also whose value x is 0.5~0.95. According to the results, these show the same trends as the one having a value of x=0.8.

A positive active material having a composition $LiNi_xCo_{(1-x)}O_2$ was made in accord with a prior art mixing and burning method. Nickel hydroxide, lithium hydroxide and cobalt hydroxide were mixed where the Ni:Co:Li atom ratio was 0.8:0.2:1.0. Then, the mixture was ballmilled and mixed, and put into an alumina crucible to be burned first in oxygen at 550° C. for 20 hours, and second at 750° C. for 2 hours. After burning the product was slowly cooled to room temperature, and milled into a powder. Although this active material has a single phase, according to its X-ray diffraction pattern, the capacity deterioration during charge-discharge cycle testing was remarkable. Thus, positive active materials having a value for x of 0, 0.1, 0.2, 0.3, 0.4, 0.5, 0.6. 0.7, 0.8,.0.9, respectively in the formula $LiNi_xCo_{(1-x)}O_2$ were prepared and incorporated into coin type cells. These cells were subjected to the charge-discharge cycle test. The results are shown in FIG. 6.

Figure 6:
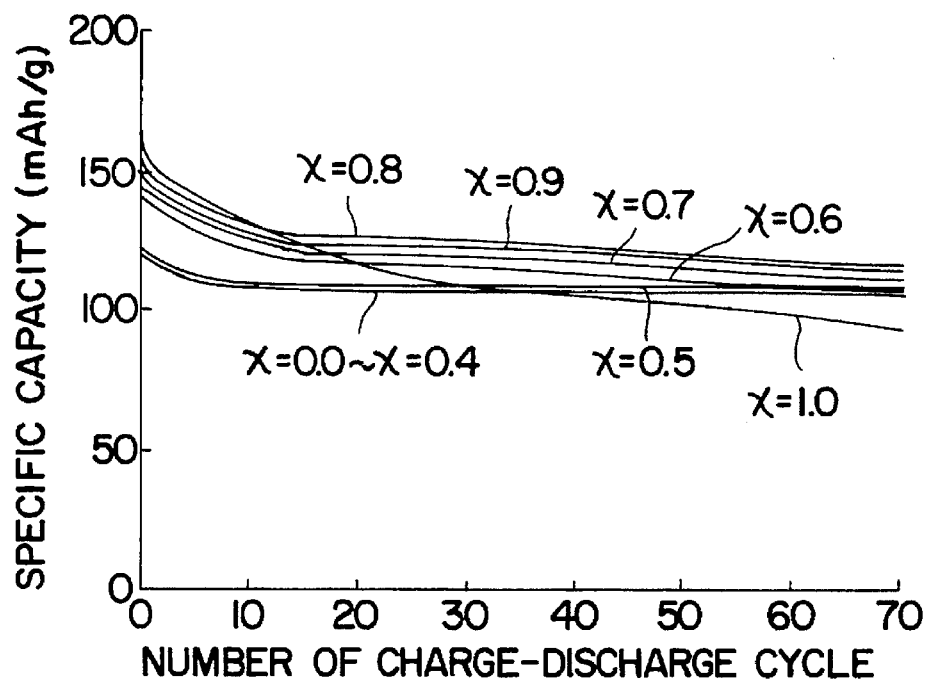
FIG. 6 is a plot of specific capacity against the number of cycles of $LiNi_xCo_{(1-x)}O_2$ positive active materials provided in accordance with a prior art process.

As shown in FIG. 6, the positive active materials prepared using a prior art process show poor cycle performance, despite having a value for x within a range 0.5–0.9. Compared with the material prepared by the prior art, those materials prepared in accordance with the present invention show excellent cycle performance.

(Embodiment 2)

A process of making Ni-Mn composite hydroxide through co-precipitation according to the present invention was the same as that of the Ni—Co composite hydroxide in Embodiment 1. As the source of Mn, any salt that can make aqueous solution, such as manganese sulfate, manganese nitrate can be used. A Ni—Mn composite hydroxide thus obtained had an X-ray diffraction pattern very close to a single phase, and an elementary analysis disclosed that it contained Mn and Ni in almost the targeted ratio. The burning process for the said Ni—Mn composite hydroxides and the Li compounds also remains the same as in Embodiment 1.

After preparing several active materials of various Mn/Ni ratios, each sample was examined by the X-ray diffraction method. As a result, when the value x in the formula $LiMi_xMn_{(1-x)}O_2$ representing the composition of active material is more than 0.7, the composite materials show a single phase X-ray diffraction pattern. When the value x is less than 0.7, the X-ray pattern is almost single phase, but the peak strength tends to weaken which shows no crystalline growth. When the value x was lower than 0.5, the hexagonal crystalline structure was broken. The positive active materials having a value for x of 0.1, 0.2, 0.3, 0.4, 0.5, 0.6. 0.7, 0.8,.0.9, 0.95, 1.0 respectively in the formula $LiNi_xMn_{(1-x)}O_2$ were prepared and incorporated into the coin type cells. The composition where x=1.0 means the $LiNiO_2$ includes no Mn. These cells were charged and discharged for the cycle life test. The charge-discharge conditions also remained the same as in Embodiment 1.

Figure 4:
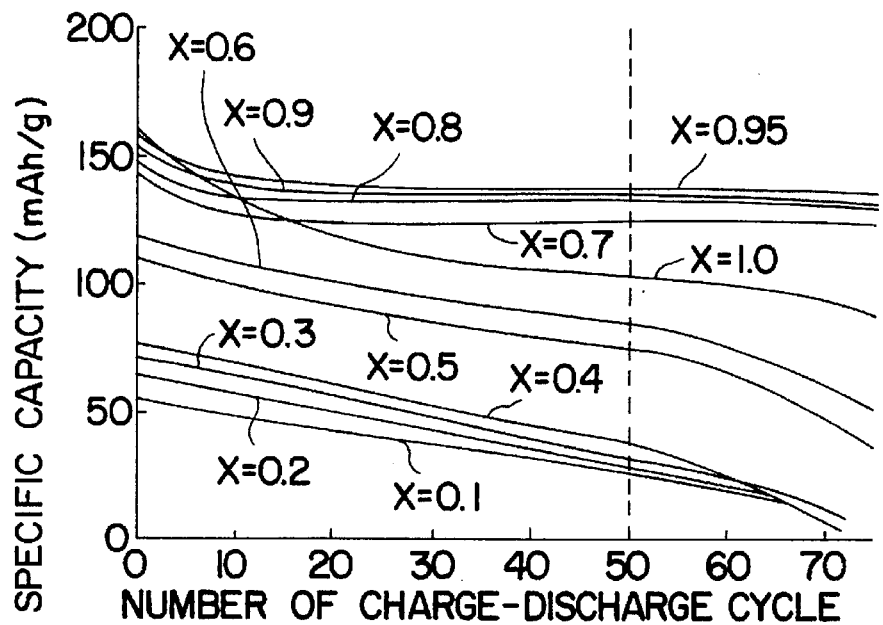
FIG. 4 is a plot of specific capacity against the number of cycles for positive active materials when the value x is varied, in accord with a second embodiment of the invention.

FIG. 4 shows results of the cycle tests. The positive active materials having a value for x within a range of x=0.1~0.4 show a small initial capacity of about 50~80 mAh/g, and remarkable cycle deterioration, down to 50% after the 50th cycle from the initial capacity and deteriorate further in the following cycles.

The positive active materials having a value for x=0.5~0.6 also show small initial capacities of about 110~120 mAh/g, and the cycle deterioration is also remarkable, down to 70% after the 50th cycle from the initial capacities, and deteriorate further in the following cycles. The positive active materials whose x value is within a range x=0.7–0.95 show large initial capacities of about 140~150 mAh/g, and excellent cycle performance which maintain 90% of the initial capacities after the 50th cycle with no observed decrease in the following cycles.

Consequently, the preferred value of x in an active material $LiNi_xMn_{(1-x)}O_2$ is within a range 0.7~0.95.

Next, the positive active materials represented by the formula $LiNi_xMn_{(1-x)}O_2$ whose value x is within a range 0.70–0.95 were prepared at the various burning temperatures.

The first preliminary burning process of 550° C. for 20 hours was carried out in the same way as set out above. In the following stage (the significant second burning process), burning temperatures of 500° C., 600° C., 650° C., 700° C., 750° C., 800° C., 850° C. and 900° C. respectively were examined. These positive active materials prepared at the various temperatures respectively, were incorporated into the coin type cells. They were tested in the charge-discharge cycle test under the same test conditions as in Embodiment 1.

Figure 5:
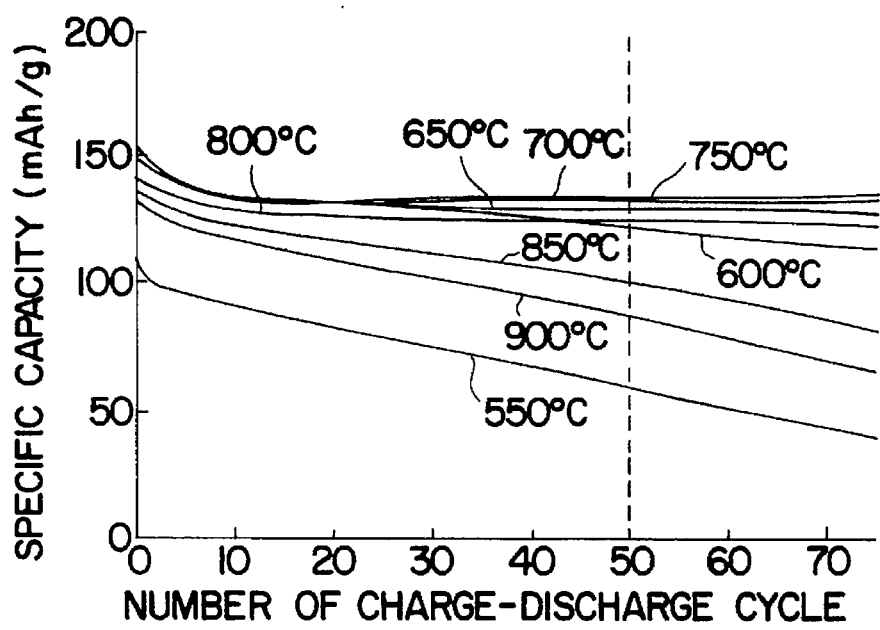
FIG. 5 is a plot of specific capacity against the number of cycles for positive active materials when the burning temperature is varied, in accord with a second embodiment of the invention.

The results when the value x was 0.8 are shown in FIG. 5 as a typical example. As shown in FIG. 5, the active materials prepared where the burning temperature was 600° C.~800° C. show good results in the initial capacities and in the cycle characteristics. Those samples burned at 550° C. shows insufficient initial capacity and unsatisfactory cycle characteristics. Those burned at 850° C. and 900° C. show smaller initial capacities and a remarkable deterioration during cycling.

From the results, the recommended burning temperature range is 600° C.~800° C. However, because the cycle deterioration increases slightly just at 600° C. and 800° C., and the initial capacity is slightly smaller just at 800° C., a range of 650° C.–750° C. is preferred.

The same experiments concerning the burning temperatures were carried out not only for materials whose value x is 0.8, but also whose value x is 0.70~0.95. According to the results, these show the same trends as the one with a value of x=0.8.

A positive active material having a composition $LiNi_xMn_{(1-x)}O_2$ was prepared in accordance with a prior art mixing and burning method. Nickel hydroxide, lithium hydroxide and manganese hydroxide were mixed with the Ni:Mn:Li atom ratio being 0.8:0.2:1.0. The mixture was ballmilled and mixed, and put into an alumina crucible for a first burning in oxygen at 550° C. for 20 hours, and a second burning at 750° C. for 2 hours. After burning, the product was slowly cooled to room temperature, and milled to a powder. According to the X-ray diffraction pattern the active material does not show single phase. The single phase was obtained only at a burning temperature higher than 800° C.

Figure 7:
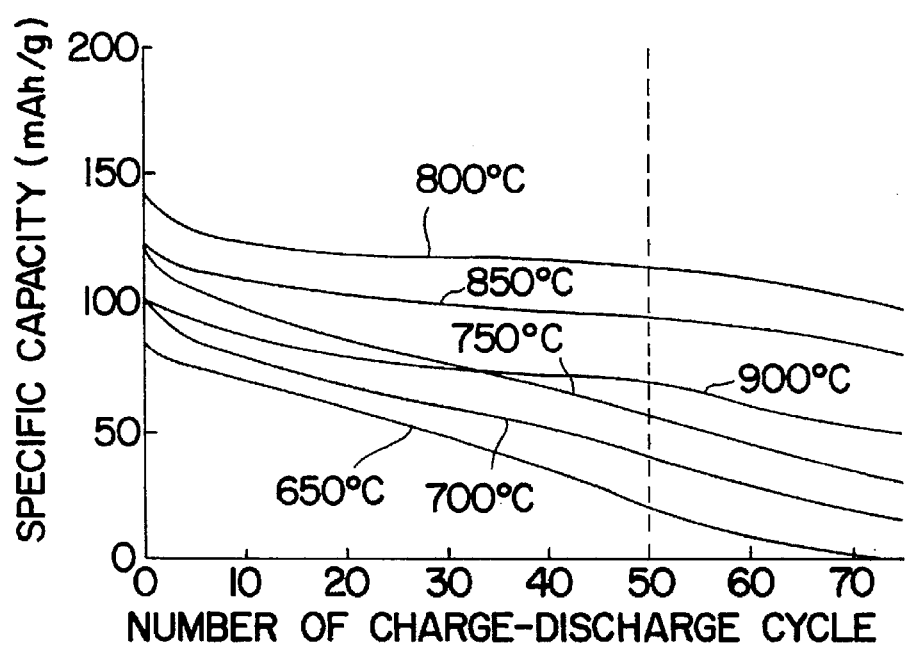
FIG. 7 is a plot of specific capacity against the number of cycles of $LiNi_xMn_{(1-x)}O_2$ positive active materials provided in accordance with a prior art process.

FIG. 7 shows results of the charge-discharge cycle test for the various active materials burned at the above mentioned temperatures. The positive active materials burned in a temperature range of 650° C.~750° C. which do not have a single phase crystal structure not only show small initial capacities, but also show poor cycle performance (the capacities have gone down below 50% after the 50th cycle from the initial capacities).

On the other hand, the positive active materials burned at a temperature higher than 800° C. show single phase crystal structure. These materials maintain 80% of the initial capacity after the 50% cycle, however the capacities go down below 100 mAh/g, and decrease further.

In the processes of manufacturing active positive materials for lithium secondary batteries according to the present invention, the nickel-cobalt composite hydroxides are provided through co-precipitation of nickel and cobalt hydroxides by adding caustic alkali aqueous solutions to mixed aqueous solutions of nickel and cobalt salts. The nickel-manganese composite hydroxides are provided through co-precipitation of nickel and manganese hydroxides by adding caustic alkali aqueous solutions to mixed aqueous solutions of nickel and manganese salts. As it is possible to completely replace a part of the Ni with Co or Mn by co-precipitation, the composite hydroxides have a single phase structure according to their X-ray diffraction patterns. The positive active materials prepared by burning Ni—Co composite hydroxides with lithium compounds or Ni—Mn composite hydroxides with lithium compounds also have a single phase crystal structure. As the single phase structure has the advantage that Li mobility in the crystal is high, the positive active materials provided through the co-precipitation by the present invention show a large capacity and excellent cycle characteristics.

What is claimed:

1. A process for making positive active materials for lithium secondary batteries comprising lithium containing oxides, nickel and cobalt, represented by a formula $LiNi_xCo_{(1-x)}O_2$, where the value x is $0.5 \leq x \leq 0.95$; comprising the steps of forming composite hydroxides comprising cobalt and nickel through co-precipitation of cobalt and nickel hydroxides by adding caustic alkali aqueous solutions to mixed aqueous solutions containing cobalt and nickel salts, mixing said composite hydroxides with lithium compounds and burning said mixture.

2. A process in accordance with claim 1, including burning the mixture of the composite hydroxides comprising cobalt and nickel and lithium compounds at a temperature not less than 600° C. and not more than 800° C.

3. A process in accordance with claim 1, wherein the cobalt salt is cobalt sulfate.

4. A process in accordance with claim 1, wherein the nickel salt is nickel sulfate.

5. A process for making positive active materials for lithium secondary batteries comprising lithium containing oxides, nickel and manganese, represented by a formula $LiNi_xMn_{(1-x)}O_2$, where the value x is $0.95 \geq x \geq 0.70$; comprising the steps of forming composite hydroxides comprising manganese and nickel through co-precipitation of manganese and nickel hydroxides by adding caustic alkali aqueous solutions to mixed aqueous solutions containing manganese and nickel salts, mixing said composite hydroxides with lithium compounds and burning said mixture.

6. A process in accordance with claim 5, including burning the mixture of the composite hydroxides comprising manganese and nickel and lithium compounds at a temperature higher than 600° C. and lower than 800° C.

7. A process in accordance with claim 5, wherein the manganese salt is manganese sulfate.

8. A process in accordance with claim 5, wherein the nickel salt is nickel sulfate.

9. A process for making lithium secondary batteries; comprising the steps of forming composite hydroxides comprising cobalt and nickel through co-precipitation of cobalt and a nickel hydroxides by adding caustic alkali aqueous solutions to mixed aqueous solutions containing cobalt and nickel salts, mixing said composite hydroxides with lithium compounds and burning said mixture to make positive active materials, forming a paste containing said positive active materials and coating said paste on aluminum foils for use as the positive electrodes for the batteries.

10. A process for making lithium secondary batteries; wherein composite hydroxides comprising manganese and nickel are formed by the steps of co-precipitation of manganese and nickel hydroxides by adding caustic alkali aqueous solutions to mixed aqueous solutions of manganese and nickel salts, mixing said composite hydroxides with a lithium compound burning said mixture to make positive active materials, forming a paste containing said positive active materials and coating said paste on aluminum foils constituting the positive electrodes of the batteries.

* * * * *